United States Patent [19]

Shimuzu et al.

[11] Patent Number: 4,637,964
[45] Date of Patent: Jan. 20, 1987

[54] MAGNETIC RECORDING MEDIUM

[75] Inventors: Yoshiro Shimuzu; Yoshio Tada, both of Nagoya, Japan

[73] Assignee: Mitsui Toatsu Chemicals, Inc., Japan

[21] Appl. No.: 754,867

[22] Filed: Jul. 12, 1985

[51] Int. Cl.$^4$ ................................................. G11B 5/70
[52] U.S. Cl. .................................. 428/694; 252/62.54; 360/134; 360/135; 360/136; 427/128; 428/523; 428/900
[58] Field of Search ............... 428/694, 900, 695, 523; 360/134–136; 252/62.54; 427/128, 131

[56] References Cited

U.S. PATENT DOCUMENTS 4,046,932  9/1977  Hartmann ........................... 428/694
4,260,466  4/1981  Shirahata ........................... 427/54.1
4,536,451  8/1985  Shen ..................................... 428/694

Primary Examiner—Ellis P. Robinson
Attorney, Agent, or Firm—McGlew and Tuttle

[57] ABSTRACT

Disclosed herein is a magnetic recording medium, (1) in which a magnetic layer is formed by coating a magnetic paint containing a magnetic powder and a binder as its main components on a non-magnetic base material; (2) which is featured by containing as said binder a polymer having an alkenyl phenol as one of the components of the polymer; and (3) which has markedly improved effects in the dispersibility of the magnetic powder in said medium and in the abrasion resistance and flexibility of the magnetic layer.

3 Claims, No Drawings

MAGNETIC RECORDING MEDIUM

BACKGROUND OF THE INVENTION

This invention relates to a magnetic recording medium in which a magnetic layer is formed by coating on a non-magnetic base material a magnetic paint containing a magnetic powder and a binder as its main components. More specifically, this invention relates to a magnetic recording medium having high dispersibility of the magnetic powder and improved abrasion resistance and flexibility of the magnetic layer.

Recently, despite advances in the field of magnetic recording media, there is in particular, a strong demand for both high-density recording and short wave-length recording and also for improved strength of the magnetic layer. To achieve these recording goals, it is necessary to improve the degree of filling of the magnetic powder, i.e., the dispersibility of the magnetic powder. On the other hand, the improved strength of the magnetic layer is dependent on the kind of resin used as the binder.

There have been proposed a wide variety of binders with a view to improving the dispersibility of the magnetic material and the strength of the magnetic layer. For example, compositions comprising a thermosetting resin such as phenolic resin, epoxy resin and melamine resin or a thermoplastic resin such as polyvinyl butyral have heretofore been proposed. When a thermosetting resin such as a phenolic resin is used as the binder, the dispersibility and the abrasion resistance are likely to be improved. However, phenolic resins are still inadequate in that they are generally low in molecular weight; are unavoidably admixed with low molecular weight components which are partially responsible for the generation of drop-out in recording play-back; are inferior in flexibility after curing; and are almost insoluble in solvents of low polarity which are widely used in magnetic paints.

BRIEF SUMMARY OF THE INVENTION

The present invention proposes a method of overcoming the aforesaid problems. Specifically, the present invention provides a novel binder comprising a polymer which contains an alkenyl phenol as one of its components, and further provides a novel magnetic recording medium using said binder.

The present invention specifically provides a magnetic recording medium by coating a magnetic paint containing a magnetic powder and a binder as its main components on a non-magnetic base material, said binder comprising a polymer containing an alkenyl phenol (hereinafter referred to as a PG polymer) as one of its components.

DETAILED DESCRIPTION OF THE PREFERRED EMBODIMENTS

The PG polymer which can be used in the present invention is a polymer obtained by copolymerizing an alkenyl phenol and at least one monomer polymerizable therewith.

Specific examples of the alkenyl phenol include vinyl phenol, n-propenyl phenol, isopropenyl phenol, n-butenyl phenol and sec-butenyl phenol As monomers polymerizable with alkenyl phenol, there may generally be mentioned aromatic vinyl monomers and aliphatic vinyl monomers. The aromatic vinyl monomers include, for example, styrene, vinyl toluene, vinyl xylene, chlorostyrene, dichlorostyrene, α-methylstyrene and p-methylstyrene. The aliphatic vinyl monomers include, for example, acrylonitrile, methacrylonitrile, acrylic acid, methacrylic acid, acrylic esters such as methyl acrylate, ethyl acrylate, propyl acrylate, butyl acrylate, hexyl acrylate and hydroxyethyl acrylate, methacrylic esters such as methyl methacrylate, ethyl methacrylate, butyl methacrylate and hydroxyethyl methacrylate, acrylamide, methacrylamide, isoprene and butadiene.

The PG polymer of the present invention can be prepared with ease by conventional polymerization such as radical polymerization, ionic polymerization and charge-transfer polymerization. In these polymerizations, such processes as emulsion polymerization, suspension polymerization and solution polymerization can be applied.

The molecular weight of the PG polymer can readily be controlled, and is preferably in the range of 5,000–200,000 or more preferably in the range of 10,000–100,000 in practice.

The PG polymer should contain at least 2% by weight or preferably at least 5% by weight of an alkenyl phenol. If the content is less than 2% by weight, the effect of improving the dispersibility of the magnetic powder, one of the features of the present invention, is almost impossible to obtain. The PG polymer, can be prepared as a binary copolymer comprising an alkenyl phenol and one of the above-described polymerizable monomers, or as a multicomponent copolymer comprising at least one alkenyl phenol and at least two of the above-described polymerizable monomers. Thus, a variety of combinations are possible depending on the purpose. A PG polymer which is in the form of a viscous liquid, semi-solid or solid can be obtained by an appropriate combination of an alkenyl phenol or alkenyl phenols and one or more of said monomers.

The PG polymer thus obtained is a polymer comprising, in combination, a phenol group-containing portion which corresponds to a thermosetting resin and a thermoplastic or elastic portion derived from a copolymerizable vinyl monomer or monomers. The drawbacks described above can be remedied by containing the PG polymer in the binder. In other words, by containing the PG polymer in the binder, it becomes possible to improve the dispersibility of the magnetic powder and the abrasion resistance of the magnetic layer. Further, the containing of the PG polymer in the binder enables generation of drop-out due to the presence of low molecular components to be prevented; flexibility, owing to the inclusion of a thermoplastic or elastic portion in the molecule, to be imparted; solubility in solvents of low-polarity to be improved; and compatibility with conventional binders to be increased.

As the magnetic powder in the magnetic layer, there may be used $\gamma\text{-}Fe_2O_3$, $Fe_3O_4$, Co-doped oxides, oxides surface-treated with a Cobalt compound, ferromagnetic $CrO_2$ and iron, or a magnetic alloy powder, such as, iron-cobalt or iron-cobalt-nickel alone or in combination.

In the present invention, conventional thermoplastic or thermosetting resins may be used with the PG polymer. In particular, thermosetting resins are so compatible with the PG polymer that the aforesaid disadvantages in the blend application with conventional thermoplastic resins can be overcome. Conventional thermoplastic resins capable of being used with the PG polymer include vinyl chloride-vinyl acetate copolymers, vinyl chloride-vinylidene chloride copolymers, acrylic ester-acrylonitrile copolymers, vinylidene chloride-acrylonitrile copolymers, polyvinyl butyral resins, polyamide resins, polyester resins and cellulose derivatives, which may be used alone or in combination. Specific examples of thermosetting resins capable of being used with the PG polymer include phenolic resins, thermosetting polyurethane resins, amino rsins, silicone resins and isocyanate prepolymer mixtures, which may be used alone or in combination.

The content of the PG polymer in the whole binder is preferably in the range of 5-90% by weight. If the content is less than 5% by weight, it is almost impossible to improve the abrasion resistance. On the other hand, if the content is over 90% by weight, running of the recording medium is liable to be unstable.

The magnetic layer may contain, if desired, additives such as dispersing agents, lubricants, abrasives and antistatic agents.

Specific examples of dispersing agents include fatty acids having 12-18 carbon atoms such as capric acid, lauric acid, stearic acid, linolic acid and oleic acid, salts of these fatty acids with alkali metals or alkaline earth metals and lecithins. The dispersing agent may be added to the binder in an amount of 1-15 parts by weight per 100 parts by weight of the binder.

Useful lubricants for the above purpose include solid lubricants such as molybdenum disulfide, tungsten disulfide, silicone oils and fatty acid esters, which may be added to the binder in an amount of 0.1-15 parts by weight per 100 parts by weight of the binder.

As abrasives, there may used silicon carbide, chromium oxide, alumina and corundum, each preferably having a particle diameter of less than 2 μm on average.

Useful antistatic agents for the above purpose include natural surfactants such as carbon black and saponin, nonionic surfactants derived from alkylene oxides or glycerol, cationic surfactants such as higher alkylamines, ammonium salts and heterocyclic compounds, anionic surfactants containing acidic radicals such as carboxylic acid, sulfonic acid, phosphoric acid, sulfuric acid ester and phosphoric acid ester, and amphoteric surfactnats such as amino acids, aminosulfonic acids, and sulfuric or phosphoric acid esters of aminoalcohols. These surfactants may be used alone or in combination.

As the non-magnetic base material, there may be used polyesters such as polyethylene terephthalate and polyethylene 2, 6 - naphthalate, polyolefins such as polypropylene, cellulose derivatives such as cellulose triacetate and cellulose diacetate, polycarbonates, polyamides and polyimides.

In the practice of the magnetic recording medium according to the present invention, there are a variety of embodiments such as the application of top-coat to impart lubricating properties or of back-layer for antistatic purposes.

The present invention is further illustrated by the following examples. It should be understood that these examples are given only for the purpose of illustration of the present invention and do not limit its scope. In the examples, all parts and percentages are by weight unless otherwise specified.

Preparation of PG polymer

EXAMPLE 1

One hundred parts of p-isopropenyl phenol, 130 parts of acrylonitrile, 770 parts of butyl acrylate and, as a solvent, 670 parts of ethyl acetate were fed into a reactor. Six parts of azobisisobutyronitrile was added thereto in two fractions three hours apart as a polymerization initiator. The resulting mixture was subjected to polymerization for ten hours under the reflux of ethyl acetate. Thereafter unreacted monomers and the solvent were removed to obtain 955 parts of a PG polymer (hereinafter referred to as PG polymer A). The content of p-isopropenyl phenol in the polymer was 10%, measured by $^{13}$C-NMR analysis. The average molecular weight of the polymer was about 19,000.

EXAMPLE 2

Three hundred parts of p-isopropenyl phenol, 100 parts of acrylonitrile, 500 parts of butyl acrylate, 100 parts of butyl methacrylate and, as a solvent, 700 parts of methyl ethyl ketone were fed into a reactor. Thereafter, 960 parts of a PG polymer (referred to as PG polymer B) was obtained in the same manner as in Example 1. The content of p-isopropenyl phenol in the polymer was 30% and the average molecular weight of the polymer was about 22,000.

EXAMPLE 3

Fifty parts of p-isopropenyl phenol, 50 parts of acrylonitrile, 900 parts of butyl acrylate and, as a solvent, 650 parts of methyl ethyl ketone were fed into a reactor. Thereafter, 965 parts of a PG polymer (called PG polymer C) was obtained in the same manner as in Example 1. The polymer contained 5% of p-isopropenyl phenol and had an average molecular weight of about 21,000.

Preparation of Magnetic Recording Medium (Magnetic Recording Tape)

EXAMPLE 4

| | |
|---|---|
| Co-coated γ-Fe$_2$O$_3$ (major axis diameter 0.6 μm, coercive force Hc 640 Oe) | 100 parts |
| binder (a mixture of 75 parts of PG polymer A and 25 parts of a novolac-type phenolic resin) | 100 parts |
| lecithin | 2 parts |
| Cr$_2$O$_3$ | 2 parts |
| carbon black | 2 parts |
| fatty acid ester | 1 part |
| methyl ethyl ketone-toluene-cyclohexanone mixed solvent (1+1+1) | 150 parts |

After kneading the foregoing starting materials in a ball mill for 18 hours in the proportions described above, 2.5 parts of an isocyanate compound (trade name Desmodur L; a product of Farbenfabriken Bayer A.G.) was added thereto and the resulting mixture was subjected to high shear-rate dispersion for 35 minutes to obtain a magnetic paint. The paint was coated on a polyethylene terephthalate film having a thickness of 160 μm in such a manner that its thickness became 4 μm after drying. The resulting film was subjected to magnetic orientation and thereafter dried and wound. This was calendered and cut into tapes having a width of 0.5 inch (12.7 mm) to obtain a magnetic tape (hereafter called Tape No. 1).

EXAMPLE 5

The procedures of Example 4 were repeated to obtain a magnetic tape, except that the binder was composed of a mixture of 70 parts of PG polymer B and 30 parts of a conventional thermosetting polyurethane resin. This tape was called Tape No. 2.

EXAMPLE 6

The procedures of Example 4 were repeated to obtain a magnetic tape, except that the binder was composed of a mixture comprising 35 parts of PG polymer C, 15 parts of a novolac-type phenolic resin and 50 parts of a vinyl chloride-vinyl acetate-vinyl alcohol copolymer (a trade name VAGH; a product of Union Carbide Corporation. This tape was called Tape No. 3.

EXAMPLE 7

A magnetic tape was prepared in the same manner as in Example 4, except that the binder was composed of a mixture comprising 40 parts of PG polymer C, 20 parts of a novolac-type phenolic resin and 40 parts of a thermosetting polyurethane resin. This tape was called Tape No. 4.

EXAMPLE 8

A magnetic tape was prepared in the same manner as in Example 4, except that the binder was composed of a mixture of 50 parts of PG polymer B and 50 parts of VAGH. This tape was called Tape No. 5.

EXAMPLE 9

A magnetic tape was prepared in the same manner as in Example 4, except that the binder was formed of a mixture comprising 55 parts of PG polymer A, 15 parts of a novolac-type phenolic resin and 30 parts of a thermosetting polyurethane resin. This tape was called Tape No. 6.

COMPARATIVE EXAMPLE 1

A magnetic tape was obtained in the same manner as in Example 4 except for using 100 parts of a novolac-type phenolic resin as the binder. This tape was called Tape No. 7.

COMPARATIVE EXAMPLE 2

A magnetic tape was obtained in the same manner as in Example 4 except that the binder was composed of 50 parts of a novolac-type phenolic resin and 50 parts of polyvinyl butyral. This tape was called Tape No. 8.

COMPARATIVE EXAMPLE 3

A magnetic tape was prepared in the same manner as in Example 4, except that the binder was composed of 50 parts of a novolac-type phenolic resin and 50 parts of polyacrylonitrile. This tape was called Tape No. 9.

The characteristics of these magnetic tapes are shown in Table 1.

In Table 1, the surface gloss was determined by a glossmeter such that a light was reflected on the surface of the magnetic layer at an angle of incidence of 75° and the amount of reflection was measured. The falling-off of magnetic powder was determined by measuring the amount of powder adhering to the running parts of a home VTR after each tape was run for a one hundred hours and is shown as the amount compared with that of Tape No. 1 as 1.0. The durability still in minutes was determined by the time duration in which the performance of recording play-back was lowered to 80% level as compared to its initial value in a home VTR. The degree of scratching of the magnetic layer was evaluated visually after the tape was run repeatedly one hundred times in a home VTR.

TABLE 1

| Tape No. | Surface gloss (%) | Powder falling-off | Durability still (minutes) | Scratching |
|---|---|---|---|---|
| 1 | 90 | 1.0 | 1100 | o |
| 2 | 85 | 1.0 | 1200 | o |
| 3 | 85 | 1.5 | 900 | o |
| 4 | 75 | 2.0 | 1100 | o |
| 5 | 80 | 1.0 | 1100 | o |
| 6 | 80 | 1.5 | 1100 | o |
| 7 | 70 | 1.5 | 400 | x |
| 8 | 80 | 2.0 | 400 | x |
| 9 | 65 | 2.5 | 800 | o |

What is claimed is:

1. A magnetic recording medium comprising a magnetic powder binder, which comprises, by weight, 5–90% of a polymer having a molecular weight of 5000–200,000 and containing therein, based on the weight of said polymer, at least 2% of an alkenyl phenol.

2. A magnetic recording medium comprising a magnetic powder binder, which comprises, by weight, 5–90% of a polymer having a molecular weight of 10,000–100,000 and containing therein, based on the weight of said polymer, at least 5% of an alkenyl phenol.

3. The magnetic powder binder of claims 1 or 2, wherein said alkenyl phenol is selected from the group consisting of vinyl phenol, n-propenyl phenol, isopropenyl phenol, n-butenyl phenol and sec-butenyl phenol.